Patented Aug. 12, 1924.

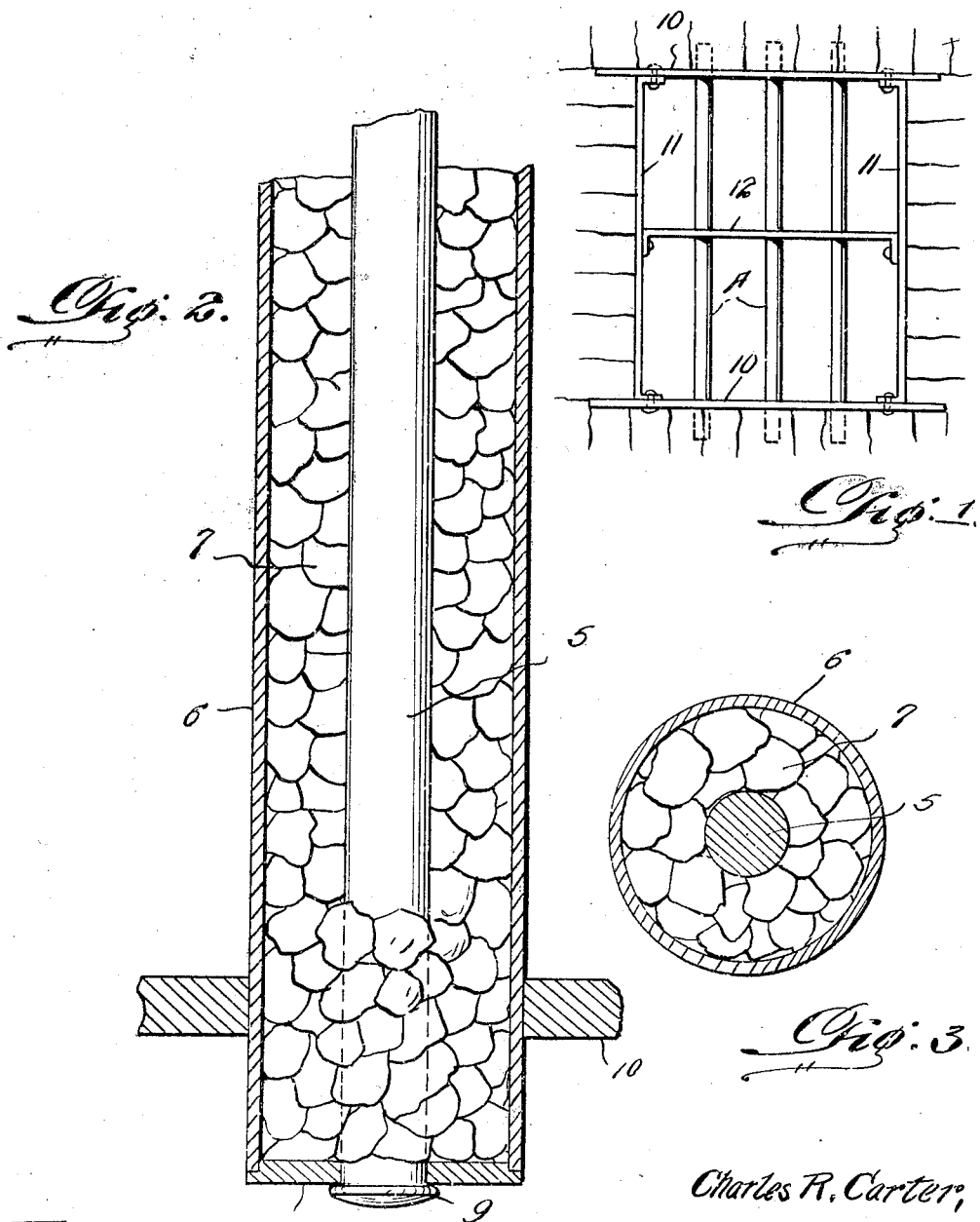

1,504,677

UNITED STATES PATENT OFFICE.

CHARLES R. CARTER, OF ST. LOUIS, MISSOURI.

METAL BAR.

Application filed May 9, 1923. Serial No. 637,921.

*To all whom it may concern:*

Be it known that CHARLES R. CARTER, a citizen of the United States, residing at St. Louis, State of Missouri, has invented certain new and useful Improvements in Metal Bars, of which the following is a specification.

In carrying out the present invention it is my purpose to provide a bar wherein the same is so constructed as to prevent the same from being cut by a hacksaw or similar tool, the bar being particularly useful for application to prison windows for preventing the escape of convicts by cutting these bars and making their exit through these windows.

The primary object of the invention is the provision of such a bar that is comparatively simple in construction, and cheap to manufacture, the same comprising essentially an inner solid bar member and an outer tubular bar with a filling of gravel therebetween.

The nature and advantages of the invention will be better understood when the following details and description is read in connection with the accompanying drawings, the invention residing in the combination, construction and arrangement of parts as claimed.

In the drawings:—

Figure 1 is an elevation of a prison window equipped with my improved bar members, Figure 2 is an enlarged fragmentary vertical cross section of the bar per se, and Figure 3 is a transverse cross section thereof.

First having reference to Figures 2 and 3 the device comprises an inner solid bar 5 and an outer tubular bar 6 with a filler of relatively large gravel 7 therebetween. The bars 5 and 6 are of any diameter and length desirable, the opposite ends of the tubular bar 6 being closed by end caps 8, these end caps being provided with a suitable opening for receiving the opposite ends of the solid bar 5, the same being maintained in position upon the ends of this bar by mushrooming the ends of the same as at 9.

In the application of my improved bar to a prison bar as shown in Figure 1, this window is equipped with upper and lower longitudinal flat like bar members 10 together with a pair of side vertical bar members 11 and a central cross bar 12. The bars 10—10 and 12 are provided with aligned openings and the upper and lower edge of the window opening being socketed in alignment with these openings for receiving the bars designated in this figure, A.

Any attempt of the prisoner to cut these bars A through the means of a hack-saw, will result in the absolute disruption of the saw before the cutting teeth of the same has reached the central solid bar 5, this is in view of the filling of gravel 7. The gravel 7 may be large grained sand, water washed pebbles or stones, larger loose rock or water washed stone, or any other form or granular rock.

In view of the above description it will at once be apparent that I have provided a bar that is particularly adapted for use in the construction of prisons or jails for preventing the escape of convicts, and even though I have herein set forth the preferred embodiment of the invention, it is nevertheless to be understood that minor changes may be made therein without departing from the spirit ond scope of the invention as claimed.

What is claimed as new and desired to secure by Letters-Patent is:—

A bar structure adapted to be used as a barrier across a wall opening comprising an exterior cylinder of metal and closed at its ends, a rod traversing the length of the cylinder and disposed centrally therein and having its ends secured in the end walls of the cylinder, the exterior surface of the rod being spaced from the interior surface of the cylinder, said rod being of metal, and a filling of gravel interposed in the space between the rod and the inner surface of the cylinder, and completely filling said space.

In testimony whereof I affix my signature.

CHARLES R. CARTER.